MULTI-APERTURE MAGNETIC CORE SYSTEMS

Original Filed Oct. 16, 1961

INVENTOR.
Lawrence R. Smith
BY
Mueller & Aichele
ATT'YS.

INVENTOR.
Lawrence R. Smith
BY
Mueller & Aichele
ATT'YS.

3,360,662

MULTI-APERTURE MAGNETIC CORE SYSTEMS

Lawrence R. Smith, Phoenix, Ariz., assignor to Motorola, Inc., Chicago, Ill., a corporation of Illinois Continuation of application Ser. No. 145,052, Oct. 16, 1961. This application June 8, 1964, Ser. No. 375,411
12 Claims. (Cl. 307—88)

This invention relates to magnetic devices and systems, and in particular relates to magnetic switching devices adapted to perform logic functions which can be expressed by Boolean algebra.

This application is a continuation of my copending application Ser. No. 145,052, filed Oct. 16, 1961, now abandoned.

There are many commercial and military applications for magnetic switching systems which can perform logic functions, such as in data processing equipment, telemetry equipment, and process control equipment, to name only a few. Such systems usually operate with signals representing information that is coded in binary form, and it is desirable to employ a signal of one polarity to represent one binary element and a signal of the opposite polarity to represent the other binary element. A magnetic core device which can be used advantageously for the switching of such bipolarity signals is described and claimed in a copending application of Lawrence R. Smith, Ser. No. 109,440, filed on May 11, 1961, and now U.S. Patent No. 3,217,300, and assigned to the present assignee. Any magnetic device of this general type will be referred to herein as a "true and complement" device since two distinguishable output signals (other than the absence of a signal) can be obtained from the device, one of which is the complement of the other.

The true and complement magnetic devices and systems to be described herein use the invention of the above co-pending application, and thus take advantage of a significant feature of that invention which is that the threshold characteristics of the magnetic material are not critical. The reason is that the operation of a true and complement magnetic device depends only on the net amount of flux that is switched at two output apertures of a multi-aperture core, rather than on flux either being switched or not switched at an output aperture, which is a typical mode of operation for prior art devices. Thus, the true and complement device has a differential action, and several benefits flow from this. The device can be operated reliably over a wider range of temperature and will tolerate wider variations in the energizing signals than devices of the prior art. Two distinguishable binary output signals are provided by the device which simplifies the implementation of switching and logic operations. Furthermore, the windings for the multi-aperture core can be arranged so that the device presents a constant load to the signal sources, and this makes it possible to simplify the circuitry of the signal sources.

The present invention is directed to the provision of true and complement magnetic devices which have the advantages just referred to, and which are especially adapted for logic applications. Practically any complex logic operation can be performed by combinations of AND, OR and TRANSFER magnetic devices. This invention provides a true and complement magnetic device capable of performing AND logic, OR logic, and combinations thereof in a single core. The core has a single output winding and at least two input windings, all of which operate with current of either polarity. A true and complement OR gate in accordance with the invention provides current of one polarity in the output winding when either or both of the two input windings receives current representing one binary element (for example, current representing binary one), and provides current of the opposite polarity in the output winding when both of the input windings receive current representing the other binary element (for example, current representing binary zero). A true and complement AND gate provides an output current of one polarity only when the two inputs receive a specific combination of current polarities. For example, a true and complement AND gate can be arranged to furnish a binary one output when positive current is supplied to both input windings, and to furnish a binary zero output when any other combination of input current polarities is received by the core. The only structural difference between the AND gate and the OR gate is that a winding of one is inverted relative to the other, and this means that complex logic systems can be built with a single basic logic device which can be used to perform different logic functions merely by modifying the windings. Combination logic such as EXCLUSIVE OR logic can be accomplished with a single true and complement core, as will be further described. Since both elements of binary information are represented by actual signals, the condition in which no signal is present can be used to indicate a malfunction for providing fail-safe operation.

In addition to the terms explained above, certain other terms of the art will be used in the following description and claims, and these terms will be defined as follows.

An "aperture" in a core is an opening extending through the material of the core which defines a closed-loop flux path in the material of the core.

A "minor aperture" is a small aperture in a core which divides the flux path about a larger aperture of the core into branches. The larger aperture is referred to herein as a "major aperture." The respective flux paths existing about major and minor apertures are referred to as "major flux path" and "minor flux path."

The "blocked" condition of a multi-aperture core is that in which flux is discontinuous about its minor apertures, and therefore cannot be reversed unless flux is also reversed about a major aperture. A multi-aperture core is ordinarily established in the blocked condition before logic is performed by it. The blocking function is sometimes referred to as "clearing."

A multi-aperture core is in a "set" condition if flux is continuous about any or all of its minor apertures. This flux can be reversed locally without reversing flux about a major aperture.

"Priming" a multi-aperture core is the process of reversing flux about one or more of its minor apertures without changing the information content of the core, such that the core will be in a desired state at a later time. For instance, a core may be primed in order to put it into proper condition for transferring information from it to a succeeding core.

"Transfer," as the term itself indicates, is the process of deriving information in the form of an output signal from a core after it has been set and transferring the information to an appropriate place. The transfer function may be combined with either the priming function or the blocking function if desired, and it is sometimes referred to as the "reading" function.

The invention is illustrated in the accompanying drawings in which.

Figure 1:
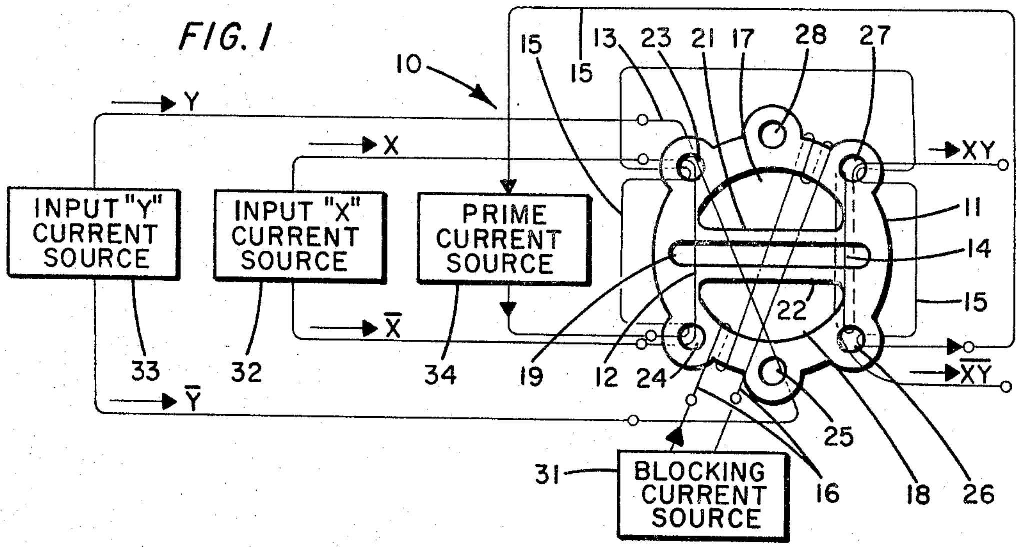
FIG. 1 is a schematic diagram showing a true and complement AND gate in accordance with the invention including a multi-aperture core together with windings and circuits for operating the core.
Figure 2:
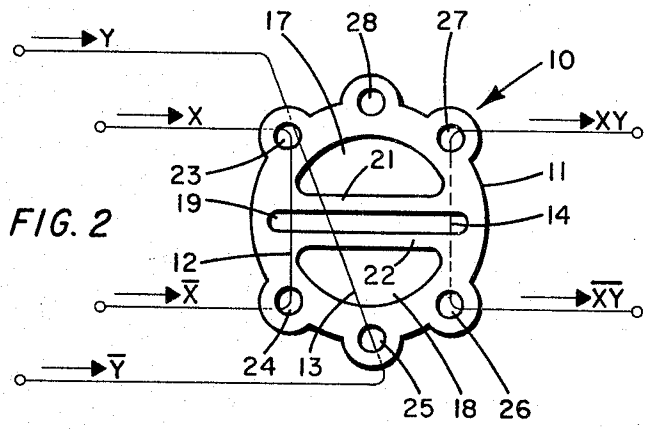
FIG. 2 is a simplified schematic diagram of the AND gate of FIG. 1 showing only the core and the input and output windings.
Figure 3:
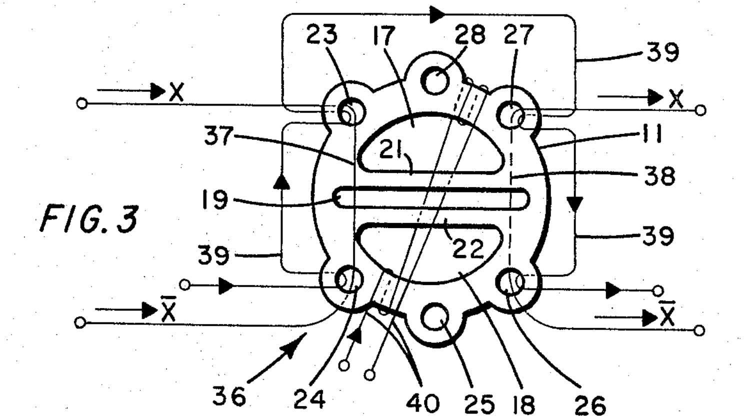
FIG. 3 is a schematic diagram of a true and complement magnetic device which can be used to provide the two input current sources represented by blocks in FIG. 1.
Figure 4:
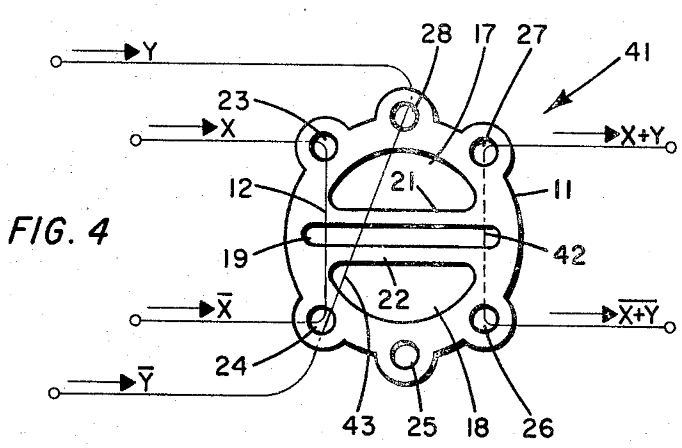
FIG. 4 is a simplified schematic diagram similar to FIG. 2, but showing a modified form of the magnetic device which serves as a true and complement OR gate.
Figure 5:
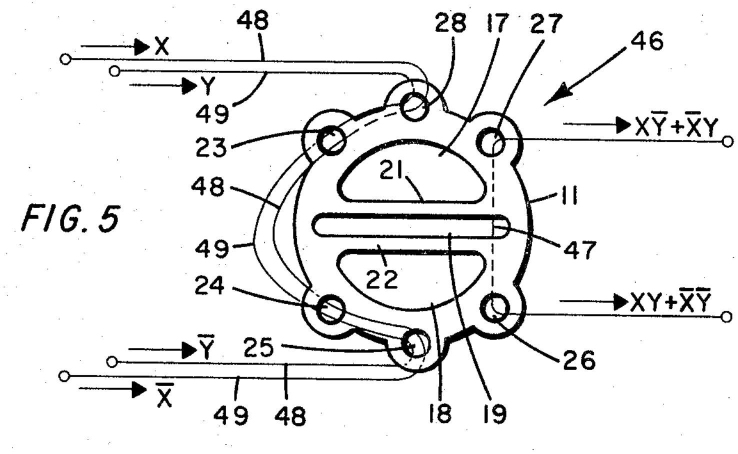
Figure 6:
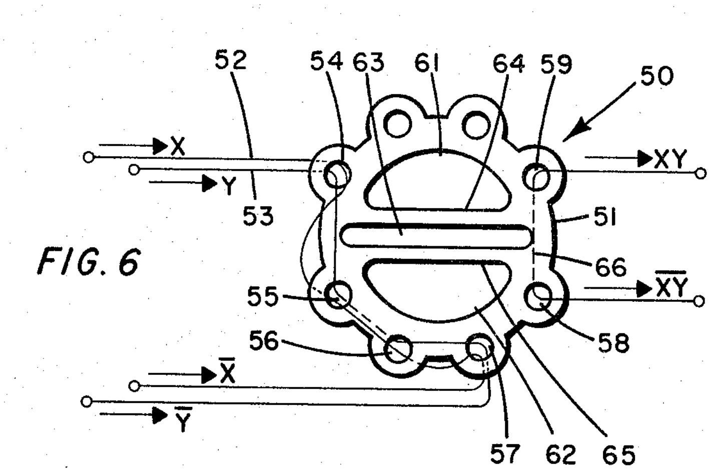

FIG. 5 is a simplified schematic diagram of a true and complement device adapted to perform EXCLUSIVE OR logic using the same multi-aperture core shown in FIGS. 1 to 4 but with a different arrangement of windings; and FIG. 6 shows an AND gate of the general type shown in FIGS. 1 and 2, but having a different arrangement of windings such that the device presents a constant load to the input signals.

Referring first to FIG. 1, there is shown a true and complement AND gate 10 in accordance with the invention. The AND gate 10 includes a multi-aperture core 11 of the type described and claimed in the above mentioned copending application of L. R. Smith. The various windings for the core are identified by the numerals 12, 13, 14, 15 and 16. Since it may be somewhat difficult to trace all of the windings in FIG. 1, the core 11 with only the two input windings 12 and 13 and the output winding 14 are shown in FIG. 2. In FIG. 1, the output winding 14 has more than one turn, but only one turn is shown in the winding 14 in FIG. 2 in order to simplify the drawing. It will be understood that the number of turns used for the various windings is a matter of design choice.

The core 11 is made of magnetic material which has a generally square or rectangular hysteresis loop. Ferrite materials for such cores are commercially available, and they may be specially tailered to meet desired material specifications for the core. The core 11 has two sections which are defined by two major apertures 17 and 18 together with two central legs 21 and 22 with a third major aperture 19 between them. The core sections associated with the major apertures 17 and 18 will be referred to as the true and complement sections respectively, although it will be understood that these designations may be reversed. There are six minor apertures in the core 11, and these apertures serve to isolate the various windings of the core from each other.

The input winding 12 passes through aperture 23 in one direction and through aperture 24 in the opposite direction such that the minor flux paths about these apertures are linked by winding 12 in an opposed relation. The other input winding 13 passes through aperture 23 in the same direction that winding 12 passes through it, and passes through aperture 25 in the opposite direction. Thus, the minor flux paths about apertures 23 and 25 are linked by winding 13 in opposed relation. The single output winding 14 for the core passes through apertures 26 and 27 in opposite directions, so the minor flux paths about apertures 26 and 27 are similarly linked by winding 14 in an opposing sense. Current can flow in either direction in the windings 12, 13 and 14, and different combinations of current polarities in these windings are used to provide input information and output information.

For purposes of this description, positive current in the input winding 12 will be in the clockwise direction as labeled X in FIGS. 1 and 2. Positive current in input winding 13, also in the clockwise direction, is labeled Y. Negative input current in the winding 12 is labeled $\overline{X}$, and negative input current in winding 13 is labeled $\overline{Y}$. Binary one information is represented by positive current, and binary zero information is represented by negative current. The level of the input currents must be sufficient to reverse flux about the major apertures 17 and 18 of the core 11.

From FIG. 1 it may be seen that the core 11 has a blocking winding 16 which links the core annulus in both the true section and the complement section and also links the two central legs 21 and 22 of the core. The turns of the blocking winding 16 are arranged such that when current is supplied through the winding from the current source 31 in the direction of the arrow shown on winding 16, flux will be continuous in the clockwise direction about the major aperture 17, and flux will also be continuous in the clockwise direction about the major aperture 18. Flux will be discontinuous about all of the minor apertures, and thus the core is in a blocked condition as defined above.

The operation of the AND gate device 10 can best be understood by considering examples referring to FIGS. 1 and 2. If a binary one is supplied to winding 12 from the current source 32 and a binary zero is supplied to winding 13 from the current source 33, the input currents will be in the directions labeled X and $\overline{Y}$. The X and $\overline{Y}$ currents pass through input aperture 23 in opposite directions, and therefore no flux switching will occur in the upper or true section of the core 11 because the magnetomotive forces produced by these currents will cancel out. The $\overline{Y}$ current will, however, switch flux in the major flux path about the aperture 18 in the complement section of the core. This flux switching will reverse the direction of flux at the inner leg adjacent the lower output aperture 26 with the result that flux will be continuous about this output aperture. At this time, output aperture 26 is set, and the other output aperture 27 is blocked. Thus the core is set in the binary zero state.

Next, the core is primed by supplying current from the source 34 through the priming winding 15 in the direction of the arrows applied to winding 15 in FIG. 1. The priming winding 15 passes through apertures 23 and 24 in a sense to reverse flux which may have been switched at those apertures by the input currents so that later (at transfer time) there will be no transfer of energy back toward the input current sources 32 and 33. The priming winding 15 passes through apertures 26 and 27 in a sense to reverse flux locally about either of these apertures which may have been set prior to the time that current is applied to the priming winding. Thus, in the example being described, the priming current will reverse flux about aperture 26 so that it will be in a proper sense to transfer the binary zero information out of the core in a subsequent transfer step of the operating cycle. The level or amplitude of the priming current is limited so that it will not exceed the switching threshold of the major flux paths about the major apertures 17 and 18. Consequently, the reversal of flux about aperture 26 by the priming current will produce current in the output winding 14, but this latter current will not be sufficient to switch flux in any succeeding core which forms a load for the AND gate 10.

After the core 11 has been primed, the information stored in it can be transferred through the output winding 14 to a succeeding core or other load. The transfer function is accomplished by blocking the core in the manner described previously. Current in the blocking winding 16 reverses flux in the outer leg at aperture 26 producing negative current in the output winding 14, and this negative current is labeled $\overline{XY}$. The $\overline{XY}$ current is sufficient to switch flux in a succeeding core, and thus a binary zero will be transferred to that core. The blocking current need not be amplitude limited, and therefore ample power is available to produce any desired level of output current from the core at transfer time.

There are four unique AND gates which can be obtained from the various possible combinations of two inputs. These may be identified as XY, $X\overline{Y}$, $\overline{X}Y$, and $\overline{XY}$. A combination of X and Y inputs to the AND gate 10 will produce the output designated XY in FIGS. 1 and 2. The cycle of operation is the same as described above. The positive X and Y input currents in windings 12 and 13 respectively will switch flux in the major path about aperture 17, and this will produce continuous flux about the output aperture 27 for the true section of the core. The X and Y currents tend to further saturate the major flux path about aperture 18, and thus no net flux will be set in the complement section of the core by these input currents. After priming, the blocking current will produce current in the output winding 14 in the direction labeled XY in FIG. 1, and this current will be sufficient to switch flux in a succeeding core which forms a load for the core 11. If either or both of the inputs for the core 11 of FIG. 1 are in the negative direction, the output current produced at transfer time will be in the negative direction labeled $\overline{XY}$.

From this it is apparent that unique AND gates for the $X\overline{Y}$, $\overline{X}Y$ and $\overline{XY}$ combinations can be obtained by simply inverting one or both of the input currents. To obtain the $\overline{XY}$ AND gate, positive current in windings 12 and 13 may be designated $\overline{X}$ and $\overline{Y}$ respectively. For the $X\overline{Y}$ AND gate, positive current in winding 12 is designated X and positive current in winding 13 is designated $\overline{Y}$. Likewise, for the $\overline{X}Y$ AND gate, positive current in winding 12 is designated $\overline{X}$ and positive current in winding 12 is designated Y. These inversions are equivalent to simply turning over one or both of the driver cores which constitute the input current sources 32 and 33, as will be described further.

A magnetic device 36 which can be used to provide the two input current sources 32 and 33 is shown in FIG. 3, and this device is fully described and claimed in the copending application of L. R. Smith referred to above. The core of the device 36 is identical to the core 11 of FIGS. 1 and 2, and therefore the same reference numerals are applied to the various elements of the core. The input winding 37 links the flux paths about the minor apertures 23 and 24 in series opposition, and the output winding 38 links the flux paths about apertures 26 and 27 in series opposition. The priming winding 37 passes through apertures 23, 24, 26 and 27 and serves the same purpose as the priming winding 15 described in connection with FIG. 1. The blocking winding 40 is also wound in the same manner as described in connection with FIG. 1.

Assuming that the core of the device 36 is initially in a blocked condition, positive (clockwise) current identified as X in the input winding 37 will set a binary one into the core producing continuous flux about the output aperture 27. The core may then be primed by current in the winding 39 to reverse flux about the aperture 27, and the prime current is limited so that it will not reverse flux about the major apertures 17 and 18 of the core 11 and also so that current produced in the output winding will not switch flux in a succeeding core to which it may be connected. The binary one output is obtained from the core by supplying current to the blocking winding 40, and this produces positive current in the direction identified X in the output winding 38.

Binary zero information is set into the device 36 in the same general manner as just described for setting a binary one, except that the current directions are reversed in the input and output windings. Specifically, current in the direction identified $\overline{X}$ in the input winding 37 will subsequently, upon priming the blocking core, produce current in the direction $\overline{X}$ in the output winding 38. Thus, the core device 36 may be used as the input current source 32 in FIG. 1, and an identical core device may be used for the input current source 33 in FIG. 1. As an alternative, the sources 32 and 33 can be AND gates or OR gates of the type described herein rather than the device 36, if desired.

For the XY AND gate, two devices 36 can be directly substituted for the sources 32 and 33 shown in FIG. 1. For the $\overline{XY}$ AND gate, the output winding 38 of each of the two driver devices would be inverted, i.e., the lower terminal of winding 38 would be connected to the upper terminal of the respective input winding 12, 13. For the $\overline{X}Y$ AND gate, the output winding of one driver device would be inverted and that of the other driver device would not be inverted. Thus, four unique AND gates can be obtained by proper selection of the connections between the device 36 of FIG. 3 and the device 10 of FIG. 1.

It may be seen that each driver core device can be used to drive two AND gates. This can be accomplished simply by providing another output winding for the device 36 which links the minor flux paths about apertures 25 and 28 in series opposition, and connecting this output winding to one of the AND gates in the manner discussed above. Thus, if all four AND gates are desired in a given magnetic system, they can be driven by two devices 36, each of which has two output windings. This means that branching in steps of greater than two will not be required in a system if it is limited to two-level logic.

FIG. 4 shows an OR gate 41 which is very similar to the AND gate 10 of FIGS. 1 and 2. The core element 11 for the OR gate 41 is identical to that of FIGS. 1 and 2, and therefore the same reference numerals have been applied to it. A priming winding and a blocking winding are provided for the OR gate 41, but since they may be identical to the windings 15 and 16 described in connection with FIGS. 1 and 2, they are not shown in FIG. 4 in order to simplify the drawing. It may be seen that the input winding 43 passes through apertures 24 and 28 in the OR gate 41, whereas the input winding 13 passes through apertures 23 and 25 in the AND gate 10. In all other respects, the construction of the devices 10 and 41 is the same.

The operation of the OR gate 41 is as follows. If positive current is produced in either of the two input windings 12 and 43, a binary one is set into the core and flux will be continuous about the output aperture 27. Upon priming and then blocking the core, positive current in the direction identified $X+Y$ is produced in the output winding 42, and this corresponds to a binary one output. The operation may be expressed as $1=X+Y$. It follows that a negative output current in the winding 42 is produced only when both of the input windings 12 and 43 receive input current in the negative directions identified $\overline{X}$ and $\overline{Y}$.

The OR gate 41 is one of four unique OR gates which may be obtained with the core 11 using two input windings. The expressions for the four OR gates are as follows.

$$1=X+Y$$

$$1=\overline{X}+Y$$

$$1=X+\overline{Y}$$

$$1=\overline{X}+\overline{Y}$$

The OR gate for the $\overline{X}+Y$ operation may be obtained by reversing the input current designations for winding 12 so that positive current is designated $\overline{X}$ and negative current is designated X. The OR gate for the $X+\overline{Y}$ operation may be obtained by reversing only the input current designations for winding 43. The OR gate for the $\overline{X}+\overline{Y}$ operation may be obtained by reversing the input designations for both of the input windings 12 and 43. As previously explained, this is equivalent to inverting the driver core devices. Two OR gates can be driven from a single driver core as explained above. Also, an OR gate core output can drive at least two other OR gates or AND gates.

FIG. 5 illustrates an embodiment of the invention in which combination logic is performed by a single core. This embodiment is an EXCLUSIVE OR device, and its operation is expressed by the Boolean equations:

$$\text{EXCLUSIVE OR}=X\overline{Y}+\overline{X}Y$$

$$\overline{\text{EXCLUSIVE OR}}=XY+\overline{XY}$$

The EXCLUSIVE OR device 46 includes a core 11 which is the same as described above. The priming and blocking windings for the core may be the same as shown in FIG. 1, and thus they are omitted in FIG. 5 in order to simplify the drawing. The output winding 47 for the core is the same as the winding 14 shown in FIGS. 1 and 2. Positive current in the direction identified X in FIG. 5 passes down through aperture 28, up through aperture 23, up through aperture 24 and down through aperture 25. Positive current in the direction identified Y in the input winding 49 passes up through aperture 28, down through aperture 23, up through aperture 24 and down through aperture 25.

Any combination of positive current in one of the two input windings 48 and 49 together with negative current in the other input winding will cause a positive output current to be produced in the output winding 47 at transfer time. The positive output current is identified as $X\overline{Y}+\overline{X}Y$. Positive current in both of the input windings 48 and 49 or negative current in both of the input windings 48 and 49 will cause negative current to be produced in the output winding 47 at transfer time. The negative output current is identified as $XY+\overline{X}\overline{Y}$.

Four unique EXCLUSIVE OR devices can be obtained by inverting the input currents for the device in the same general manner as described above. Since an OR gate is simply the negation of an AND gate, it will be apparent that any two of the four possible combinations of OR signals ($X+Y$, $X+\overline{Y}$, $\overline{X}+Y$, and $\overline{X}+\overline{Y}$) can be "anded" in a similar manner.

FIG. 6 illustrates a modified AND gate 50. In this embodiment, the core element 51 has eight minor apertures rather than six as in the core 11 of FIGS. 1 and 2. The logic function performed by the AND gate 50 is the same as that performed by the AND gate 10. However, the load presented to the input windings 52 and 53 of the AND gate 50 is constant regardless of what combination of input signals it receives, whereas this is not true of the AND gate 10. The positive current identified X in the input winding 52 passes up through aperture 54, up through aperture 55, down through aperture 56, and down through aperture 57. Positive current identified Y in the other input winding 53 passes up through aperture 54, down through aperture 55, up through aperture 56, and down through aperture 57. It may be seen that a binary one can be set into the core only when there is positive current in both of the input windings 52 and 53. If there is negative current in one input winding and positive current in the other, the magnetomotive forces at aperture 54 will cancel and no flux will be switched in the true section. If both input currents are negative, the currents will tend to further saturate the flux path about aperture 61 so that no net flux will be switched in the true section.

The reason that the device 50 presents a constant load to the input windings is that flux is set in either the upper half of the core or the lower half only when input current flows through a minor aperture in the same direction in both input windings. For instance, X and Y currents both pass through aperture 54 in the same direction to set a binary one in the core. X and $\overline{Y}$ currents both flow up through aperture 55 and this will set a binary zero in the core. $\overline{X}$ and Y currents both flow up through aperture 56 setting a binary one in the core. $\overline{X}$ and $\overline{Y}$ currents both flow up through aperture 57 to set a binary zero in the core.

It is apparent from the foregoing description that the invention provides a basic type of true and complement magnetic device which can perform a wide variety of logic functions with two inputs. Complex logic systems can be built up employing the OR devices, and AND devices described herein, and practically any complex logic operation can be performed in this manner. So long as the system is limited to two-level logic, branching in steps greater than two is not necessary, and this simplifies the circuitry, reduces the number of cores required, and reduces power losses.

I claim:

1. A multiple-input magnetic device adapted for use in performing OR and AND logic, and including in combination core means of magnetic material having relatively great flux retentivity, said core means having first and second core portions with a major aperture in each said core portion, and said first and second core portions each having a plurality of minor apertures therein, a first input winding linking at least first and second ones of said minor apertures in said first and second core portions respectively, a second input winding linking at least said first minor aperture and a third minor aperture in said second core portion, an output winding linking in a sense to cause voltage cancellation therein fourth and fifth ones of said minor apertures in said first and second core portions respectively, blocking circuit means linking said first and second core portions, and further circuit means linking at least said fourth and fifth minor apertures.

2. A multiple-input magnetic device adapted for use in performing OR and AND logic and including in combination core means of magnetic material having relatively great flux retentivity, said core means having a first core portion with a major aperture therein defining a major closed-loop flux path in said magnetic material and having a second core portion with a major aperture therein defining another major closed-loop flux path in said magnetic material, said first and second portions of said core means each having a plurality of minor apertures therein dividing said major flux paths into branches, with the magnetic material of said core means forming minor closed-loop flux paths individual to and about said minor apertures, a first input winding linking at least first and second ones of said minor apertures in said first and second core portions respectively, a second input winding linking at least said first minor aperture and a third one of said minor apertures in said second core portion, an output winding linking in a sense to provide voltage cancellation therein fourth and fifth ones of said minor apertures in said first and second core portions respectively, blocking winding means for said core means adapted to establish the same in a blocked condition upon energization thereof, and winding means for said core means adapted to reverse flux locally at least about said fourth and fifth minor apertures.

3. A magnetic device having at least two inputs each operable by current of either polarity and adapted to perform logic functions wherein information is represented by combinations of input current polarities, said device including in combination magnetic material which has relatively great flux retentivity, said magnetic material having a first major aperture therein defining a first major closed-loop flux path and having a second major aperture therein defining a second major closed-loop flux path, means adapted to produce continuous flux in said magnetic material about each of said major flux paths for establishing said device in a blocked condition, said magnetic material further having a plurality of minor apertures in each of said major flux paths dividing the same into branches and defining minor closed-loop flux paths individual to and about each of said minor apertures, an output winding linking at least a first and a second of said minor flux paths in said first and second major flux paths respectively, a first input winding linking at least a third and a fourth of said minor flux paths in said first and second major flux paths respectively, a second input winding linking at least said third minor flux path and a fifth minor flux path in said second major flux path, said input windings each being adapted to be energized with current of either polarity for establishing said device in a set condition in which flux is continuous locally about one of said first and second minor flux paths, and means adapted to reverse flux locally about either of said first and second minor flux paths when said device is in the set condition thereof.

4. A magnetic device comprising a core element of magnetic material which has relatively great flux retentivity, said core element having at least two major apertures therein each defining a major closed-loop flux path in said core element, and said core element having a plurality of minor apertures in each of said major flux paths dividing the same into branches and forming minor closed-loop flux paths in said element individual to and about each of said minor apertures, a first input winding which passes through a first such minor aperture in one of said major flux paths in one direction and passes through a second such minor aperture in the other of said major flux paths in an opposite direction, a second input winding which passes through said first minor aperture in said one direction and passes through a third such minor aperture in said other major flux path in the opposite direction, output winding means linking a fourth such minor aperture in said one major flux path and a fifth such minor aperture in said other major flux path in an opposed sense, means adapted to produce continuous flux about said major flux paths, and means for switching flux locally about said fourth and fifth minor apertures, whereby said magentic device can be set by input currents of various combinations of current polarity in said input windings to produce output current of selected polarity in said output winding for the purpose of performing logic functions.

5. A magnetic device adapted for use in performing AND and OR logic, and including in combination core means of magnetic material having relatively great flux retentivity, said core means having first and second core portions with a major aperture in each of said core portions, and each of said core portions having at least three minor apertures therein, blocking circuit means for said core means, first and second input windings each linking at least a first and a second of said minor apertures in said first core portion and a third and a fourth of said minor apertures in said second core portion, with said input windings passing through two of said minor apertures in the same direction and passing through the other two of said minor apertures in opposite directions, an output winding linking in a sense to cause voltage cancellation therein at least a fifth and a sixth of said minor apertures in said first and second core portions respectively, and further winding means linking at least said fifth and sixth minor apertures.

6. A magnetic device adapted for use in performing AND and OR logic, and including in combination core means of magnetic material having relatively great flux retentivity, said core means having first and second core portions with a major aperture in each of said core portions, said first core portion having at least two minor apertures therein and said second core portion having at least four minor apertures therein, blocking circuit means for said core means, first and second input windings linking one of said minor apertures in said first core portion and three of said minor apertures in said second core portion, said first and second input windings passing through said one minor aperture in the same direction, and passing through two of said three minor apertures in opposite directions and through the third one in the same direction, an output winding linking in a sense to cause voltage cancellation therein a second one of said minor apertures in said first core portion and a fourth one of said minor apertures in said second core portion, and further winding means linking at least said second and fourth minor apertures.

7. A multiple-input magnetic system for use in performing logic functions comprising core means of magnetic material having relatively great flux retentivity, said core means having first and second core portions with a major aperture in each of said core portions and a plurality of minor apertures in each of said core portions, first and second input windings linking at least the same one of said minor apertures in said first core portion to provide a gate function and also linking minor apertures in said second core portion in a sense to provide the negation of said gate function, an output winding linking in a sense to cause voltage cancellation therein at least two other ones of said minor apertures in said first and second core portions respectively, first and second input current sources coupled to said first and second input windings respectively and each adapted to supply current of both polarities to the respective input winding for selectively establishing said core means in a set condition in which flux is continuous about one of said minor apertures linked by said output winding, winding means for said core means for reversing flux locally about said minor apertures, and further winding means for said core means adapted to establish the same in a blocked condition in which flux is discontinuous about said minor apertures.

8. A magnetic system, including in combination magnetic material with square-loop hysteresis characteristics having first and second major apertures therein defining first and second major flux paths in said magnetic material, said magnetic material further having a plurality of minor apertures therein in each of said major flux paths, first and second input windings for said device linking at least the same one of said minor apertures in said first major flux path to provide a gate function and also linking minor apertures in said second major flux path in a sense to provide negation of said gate function, output winding means linking at least one other of said minor apertures in each of said major flux paths in an opposed sense, first and second input current sources coupled to said first and second input windings respectively and each adapted to supply current of both polarities to the respective input winding, with input currents of selected polarities being effective to establish said magnetic material in a set condition in which flux is continuous about one of said minor apertures linked by said output winding means, winding means for said magnetic material adapted upon energization thereof with current to reverse flux locally about said minor apertures linked by said output winding means, and further winding means for said magnetic material adapted upon energization thereof with current to establish said material in a blocked condition.

9. A multiple-input magnetic device which includes a core of magnetic material with square-loop hysteresis characteristics having first and second major apertures therein defining first and second major flux paths in said magnetic material, said core further having a plurality of minor apertures in each of said major flux paths, and having a winding threading said major apertures adapted to establish said core in a blocked condition and another winding threading said minor apertures adapted to reverse flux about the same, said device further including and being characterized by first and second input windings threading at least one of said minor apertures in each of said major flux paths, with said input windings passing in the same sense through the same minor aperture in one of said flux paths in order to provide a gate function, and said input windings passing through minor apertures in the other of said flux paths in a sense to provide negation of the gate function, and an output winding threading another minor aperture in each of said flux paths and linking the core material about said minor apertures in a sense to cause voltage cancellation therein, said output winding being adapted to carry current in one direction for representing the gate output and to carry current in the opposite direction for representing the negation of said gate output.

10. The magnetic device of claim 9 in which said first input winding passes through a first minor aperture in said first major flux path and passes through a second minor aperture in said second major flux path, and in which said second input winding passes through said first minor aperture and further passes through a third minor aperture in said second major flux path.

11. The magnetic device of claim 9 in which said first and second windings both thread a first and a second minor aperture in said first major flux path and also both thread a third and a fourth minor aperture in said second major flux path, said input windings passing through said first minor aperture in the same sense relative to each other and through said second minor aperture in the same sense relative to each other but in an opposite sense relative to said first aperture, and said input windings passing through said third minor aperture in an opposed sense and through said fourth minor aperture in an opposed sense.

12. The magnetic device of claim 9 in which said first and second input windings pass in the same direction through one minor aperture in said first major flux path and pass through three minor apertures in said second major flux path, said windings passing through two of said three apertures in opposite directions and through a third of said apertures in the same direction relative to each other.

References Cited

UNITED STATES PATENTS

| | | | |
|---|---|---|---|
| 3,026,421 | 3/1962 | Crane et al. -------- | 340—174 |
| 3,298,004 | 1/1967 | Smith ------------- | 340—174 |

BERNARD KONICK, *Primary Examiner.*

JAMES W. MOFFITT, *Examiner.*